United States Patent [19]

Smith

[11] 4,231,674
[45] Nov. 4, 1980

[54] CLIP FOR ATTACHING GUIDE RAILS TO A FRAME

[75] Inventor: Henry E. Smith, Pleasanton, Canada

[73] Assignee: Xerox Corporation, Stamford, Conn.

[21] Appl. No.: 24,806

[22] Filed: Mar. 28, 1979

[51] Int. Cl.³ .............................. B25G 3/00; F16B 7/08
[52] U.S. Cl. ....................................... 403/233; 403/397
[58] Field of Search ............... 403/233, 235, 237, 234, 403/191, 190, 397, 387, 400, 405

[56] References Cited

U.S. PATENT DOCUMENTS

| 1,441,455 | 1/1923 | Rudall et al. | 403/191 |
| 2,972,494 | 2/1961 | Dominic | 403/400 |
| 3,872,960 | 3/1975 | Gabor | 74/89.22 X |
| 3,905,070 | 9/1975 | Macrae | 403/400X |

Primary Examiner—Andrew V. Kundrat

[57] ABSTRACT

A clip for attaching printing unit guide rails to a printing apparatus guide rail support member. The clip is held to the print frame by spring tension between a spring foot and a guide rail retainer. The guide rail is held in place in the clip by spring tension between a leaf spring and the guide rail retainer.

2 Claims, 4 Drawing Figures

CLIP FOR ATTACHING GUIDE RAILS TO A FRAME

The invention relates to a clip for connecting printing unit guide rails in a printing apparatus to the printing apparatus frame. The clip is attached to the printer frame guide rail supports by spring tension by utilizing hangers and a spring foot, which is pressed into a slot in the printer frame. The clip is provided with a second spring means to lock the guide rail firmly in place in the clip and hence in relation to the printer frame.

In printing devices, such as the Xerox 800 and 850 Electronic Typing Systems, a movable carriage is used to transport a print wheel printing unit. This carriage is movable along guide rails or rods, which extend across the face of the typing system platen. The prior art method of attaching these guide rails is shown in FIG. 1. Frame member 1 has a recess 3 for holding a guide rail. Clamp 5 and the associated screws 6 are used to hold the guide rail (not shown) in place. It can be seen that this method of attaching a guide rail to a printer frame first requires that frame member 1 be drilled and tapped to receive the screws. Also, member 1 must be thick enough to be drilled and tapped. Further, during assembly, it is necessary to bolt on a total of four of these clamps for each printer apparatus, one for each end of both guide rails. This system for attaching guide rails is accordingly relatively expensive and time consuming.

The present invention as claimed is intended to provide a remedy. It solves the problem of how to quickly, efficiently and economically attach guide rails to the frame of a printing apparatus. The advantages offered by the invention are mainly that it is not necessary to drill and tap screw holes into a frame and to use a guide rail support, which is sufficiently thick to support the screws and also to reduce assembly operations to the steps of simply placing the guide rail in the guide rail support, and then placing the clip over the guide rail and pressing it onto the guide rail support.

One way of carrying out the invention is described in detail below with reference to drawings, which illustrate only one specific embodiment, in which.

Figure 3A:
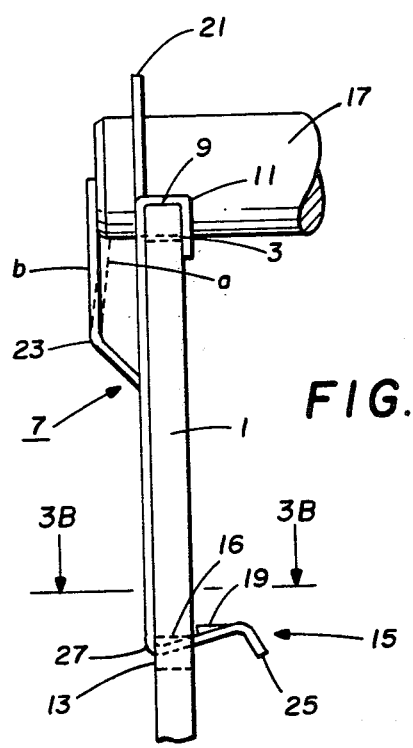
Figure 3B:
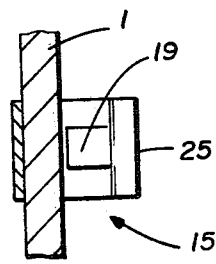

FIG. 3A shows a side view of a clip 7 in place on guide rail support frame 1 and with guide rail 17 in place; and FIG. 3B is a sectional view of the assembly of FIG. 3A taken along lines 3B—3B.

For a detailed description of an apparatus in which the present invention is particularly suited, see U.S. Pat. No. 3,872,960, issued Mar. 25, 1975. The guide rails are numbered 16 and 17 in that patent disclosure.

Figure 1:
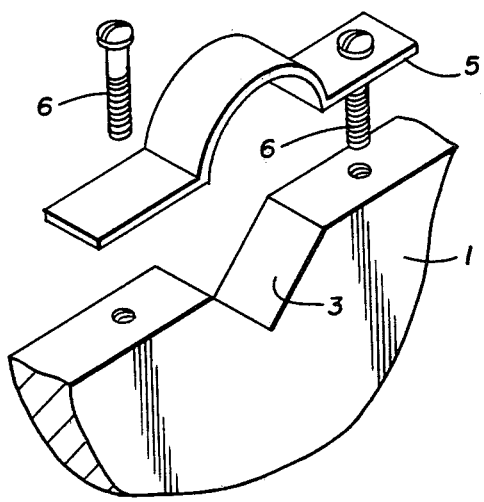
FIG. 1 is a perspective view of a prior art clamping device described above. It can be seen that for each end of a guide rail (not shown), it is necessary to provide two threaded holes, two screws and a clamp and that the assembly operation requires the lining up and tightening of two screws.
Figure 2:
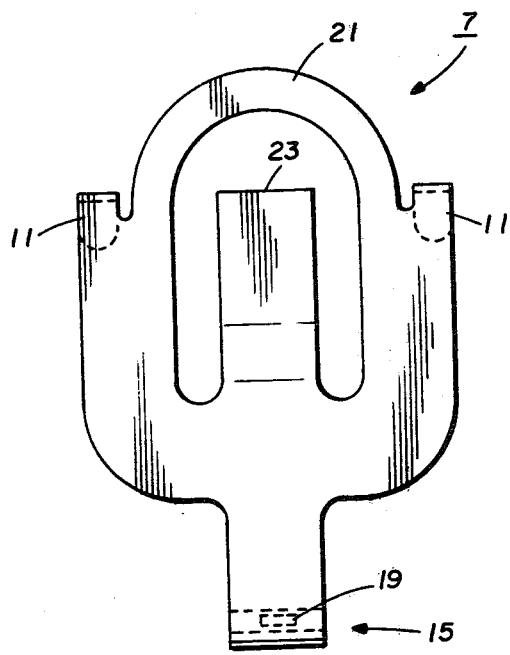
FIG. 2 shows a front view of a clip 7 in accordance with the present invention.

Referring now to FIGS. 2 and 3A, printing machine frame 1 is provided with a recess 3. In FIG. 1 recess 3 is shown as a V-shaped opening. The recess 3 can be hemispherical or any other convenient shape. Guide rail support frame 1 also has flat edges 9 of sufficient length and thickness to support clip hangers 11. Frame 1 is further provided with a slot 13 for receiving a spring foot generally designated as 15. Foot 15 is bent to act as a spring against the edge 16 of slot 13. Foot 15 also has a raised retainer portion 19 for ensuring that foot 15 stays in slot 13. Clip 7 is further provided with a guide rail retainer section 21, which is designed in combination with leaf spring 23 to hold guide rail 17 firmly locked between them. The clip 7 is attached to guide support frame member 1 by hanging the clip from hangers 11 over edges 9. Foot 15 is then pushed into slot 13. The leading edge 25 of foot 15 is bent to guide foot 15 through slot 13. The foot 15 is bent in such a manner at point 27 so that when foot 15 is pushed into slot 13, foot 15 pushes in a counterclockwise direction as seen in FIG. 3A; however, edge 16 prevents further movement. This spring tension causes clip 7 to "squeeze" frame member 1 and guide rail 17 between retainer section 21 and foot 15, which holds the guide rail 17 and clip 7 firmly in place. Movement of the foot 15 in a counterclockwise direction causes the leaf spring 23 to be forced in a counterclockwise direction, as seen in FIG. 3A, i.e., moving from position a to position b. This prevents axial movement of the guide rail 17. Preferably, clip 7 is made of steel, which has been spring tempered.

Although I have described a preferred embodiment of my invention, it should be understood that the invention is not limited thereto but may be otherwise embodied within the scope of the following claims.

What is claimed is:

1. A clip for attaching a guide rail to a guide rail support member characterized in that said clip includes hanger means and first spring means for holding said clip on a guide rail support member by spring tension between said hanger means and said first spring means, said clip further including a second spring member for preventing axial movement of a guide rail and retention means for retaining a guide rail in said clip and in contact with said second spring means.

2. The clip of claim 1 and further including foot retention means on said first spring means for preventing dislodging of said first spring.

* * * * *

UNITED STATES PATENT AND TRADEMARK OFFICE
CERTIFICATE OF CORRECTION

PATENT NO. : 4,231,674
DATED : November 4, 1980
INVENTOR(S) : Henry E. Smith

It is certified that error appears in the above-identified patent and that said Letters Patent are hereby corrected as shown below:

Please correct Applicant's address as follows:

Change "Canada" to read —California—.

Signed and Sealed this

Seventeenth Day of March 1981

[SEAL]

Attest:

RENE D. TEGTMEYER

Attesting Officer

Acting Commissioner of Patents and Trademarks